United States Patent [19]

Roinestad

[11] Patent Number: 4,741,430

[45] Date of Patent: May 3, 1988

[54] POSITIVE DRIVE HELICAL CONVEYOR SYSTEM

[75] Inventor: Gerald C. Roinestad, Winchester, Va.

[73] Assignee: Ashworth Bros., Inc., Fall River, Mass.

[21] Appl. No.: 780,790

[22] Filed: Sep. 27, 1985

[51] Int. Cl.⁴ .................................. B65G 21/18
[52] U.S. Cl. ..................... 198/778; 198/833
[58] Field of Search ............... 198/778, 833, 852, 328

[56] References Cited

U.S. PATENT DOCUMENTS

| | | | |
|---|---|---|---|
| 723,325 | 3/1903 | Souder | 198/328 X |
| 792,623 | 6/1905 | Souder | 198/778 X |
| 2,609,086 | 9/1952 | McBride et al. | 198/833 X |
| 3,315,492 | 4/1967 | Dreksler | 198/778 X |
| 3,348,659 | 10/1967 | Roinestad | 198/778 |
| 3,664,487 | 5/1972 | Ballenger | 198/778 |
| 3,750,859 | 8/1973 | Smith | 198/778 |
| 4,118,181 | 10/1978 | Onodera | 432/121 |
| 4,444,248 | 4/1984 | Hirosuke | 432/121 X |
| 4,448,301 | 5/1984 | Alger | 198/778 |
| 4,450,953 | 5/1984 | LeCann et al. | 198/778 |

FOREIGN PATENT DOCUMENTS 630499  5/1936  Fed. Rep. of Germany ...... 198/833

Primary Examiner—Joseph E. Valenza
Assistant Examiner—Jonathan D. Holmes
Attorney, Agent, or Firm—Banner, Birch, McKie & Beckett

[57] ABSTRACT

A helical conveyor system is disclosed. A conveyor belt 11 is positively driven by drive cage 21 around a plurality of vertically spaced helical loops. A pair of supplemental positive drives 25 and 26, which are driven at the same speed and synchronized with the drive cage, engage the belt 11 near its entry into and exit from the helical portion of its endless path. Vertical driving bars 45 on the drive cage 21 positively engage the cross rod heads 14 of the belt 11 in its helical path. The driving surfaces of the bars 45 are relieved at 61 and 62 to prevent driving engagement with the rod heads 14 over an inlet section of the first loop and an exit section of the last loop. The driving bars 45 also engage the ends of the rod heads 14 to limit the penetration of the driving bars past the edge of the belt.

17 Claims, 8 Drawing Sheets

POSITIVE DRIVE HELICAL CONVEYOR SYSTEM

TECHNICAL FIELD

This invention relates to endless conveyor belt systems and more particularly to such systems in which conveyor belts are driven in a helical path.

BACKGROUND OF THE INVENTION

Conveyor systems in which link-type conveyor belts are driven in a helical path with the belt curving edgewise around a series of vertically spaced loops are commonly used to provide a great length of endless conveyor belt in a relatively small space. One widely used conveyor system of the type described is disclosed in applicant's U.S. Pat. No. 3,348,659. In that system, the belt is frictionally driven by driving elements which slidingly engage the radially inner edge of the belt in the helical loops. The driving elements move faster than the belt and continuously slide past the belt edge to achieve a frictional as opposed to a direct or positive drive. This prior system provides smooth dependable operation within its safe operating parameters, relative to speed, loading and belt width. When such parameters are exceeded, however, the belt is subjected to excessively high tension which can result in excessive wear and fatigue failure of the belt in addition to causing damage to the conveyor structure. Further, when the safe parameters are exceeded, surging of the belt can result which interferes with its smooth operation and causes disturbance of the products being conveyed.

Attempts have been made in certain prior art conveyor systems to employ a positive drive in which the radially inner edge of the belt is directly driven by the continued abutting engagement between the driving elements and the belt as opposed to a sliding frictional engagement. Such positive drives, however, are beset by certain difficulties and characterized by serious disadvantages. To obtain a positive drive, the driving elements must extend past the outer belt surface into the belt structure to engage interior driven surfaces of the belt. In a helical conveyor system, such engagement is difficult to initiate and maintain smoothly. Necessarily as the belt tangentially approaches and moves into its first helical loop, the pitch of the links along its radially inner edge changes as the curvature of the edge changes. Initial engagement of the drive elements with the driven surfaces along the belt edge while their pitch is changing results in rough belt operation and excessive wear of the affected components. Moreover, after the initial engagement, any significant variation in the pitch of the driven surfaces while traversing the helical loops is disadvantageous. Such pitch changes occur with any significant variation in the length of the belt in the helical path. If there is an increase in pitch, driving contact can be lost. The belt can thus migrate backwardly along the loops and become slack in its approach to the first loop. If there is a decrease in the pitch, excessive belt tension results which causes various problems including surging, excessive wear, fatigue failure and other damage to the system. Still further, the invasion of the driving elements past the edge of the belt to contact the driven surfaces can result in damage if there is excessive penetration resulting in extraneous engagement with parts of the belt other than the intended driven surfaces. Such disadvantages are overcome by the present invention.

SUMMARY OF THE INVENTION

The invention relates to a conveyor system which comprises an endless flat belt having a plurality of links connected together and adapted for alternate collapse and expansion along one or both edges to permit passage of the belt around lateral curves. Apparatus is provided to support the belt for passage through an endless path including a helical portion extending through a plurality of vertically spaced loops with the belt curved laterally in each of the loops, an approach portion leading into the first loop at one end of the helical portion and an exit portion leading away from the last loop at the other end of the helical portion. Primary drive means are provided to engage the belt in positive driving relationship at a plurality of places closely spaced circumferentially along a radially inner edge of the belt in each of the loops. A preferred embodiment of the invention includes secondary drive means synchronized with the primary drive and positively engaging the belt at a first location near, i.e., closely adjacent, the entrance end of the helical portion and at a second location near, i.e., closely adjacent, the exit end of the helical portion to cause the belt to travel at the same speed at the first and second locations. The locations where the secondary drive means engages the belt are selected and positioned to maintain a substantially fixed length of belt extending between the opposite ends of the helical loops to enable the belt to be positively driven smoothly through the loops by the primary positive drive under substantially minimal tension and substantially minimal driving pressure exerted by the primary drive.

Preferably, the primary drive comprises a cylindrical cage rotatable about a vertical axis and having a plurality of vertical driving bars spaced circumferentially around the cage. The bars have radial driving surfaces overlapping and abutting and in positive driving relationship with protrusions which are spaced along the radially inner edge of the belt in the helical loops. The driving bars preferably have circumferential surfaces engaging the end surfaces of the protrusions to limit the overlapping of the bars and the protrusions to prevent substantial extraneous contact between the cage and the belt, the protrusions being slidable vertically along the bars while the cage rotates to positively drive the belt.

Another significant feature of the invention permits smooth engagement of the cage bars with the belt edge protrusions as the belt enters the first loop at one end of the helical portion and smooth disengagement of the bars from the protrusions as the belt leaves the last loop at the opposite end of the helical portion. Such smooth engagement and disengagement is effected by providing bars which are relieved adjacent the ends of the helical portion of the belt path so that the radial driving surfaces of the bars do not engage the belt protrusions over a short entry section of the first circular loop at one end of the helical portion and over a short exit section of the last loop at the other end of the helical portion, said engagement of said driving surfaces and protrusions occurring in said first and last loops only when the radially inner belt edge has the same curvature as in the remaining loops.

In terms of method, the invention comprises a series of steps for driving an endless flat belt along a path having a helical portion, an entrance portion and an exit portion. Such steps include supporting the belt in a laterally curving orientation to form a plurality of vertically spaced, generally horizontal loops in the helical portion with the radially inner edges of the belt in the loops defining substantially a cylinder, applying a positive driving force circumferentially of the cylinder to the radially inner edge of the belt at closely spaced places along the loops and selectively applying positive driving and positive retarding forces to the belt at a first location near the entrance end and at a second location near the exit end to maintain a substantially constant length of the belt through the helical portion under substantially minimal longitudinal tension.

DETAILED DESCRIPTION OF THE INVENTION

Figure 1:
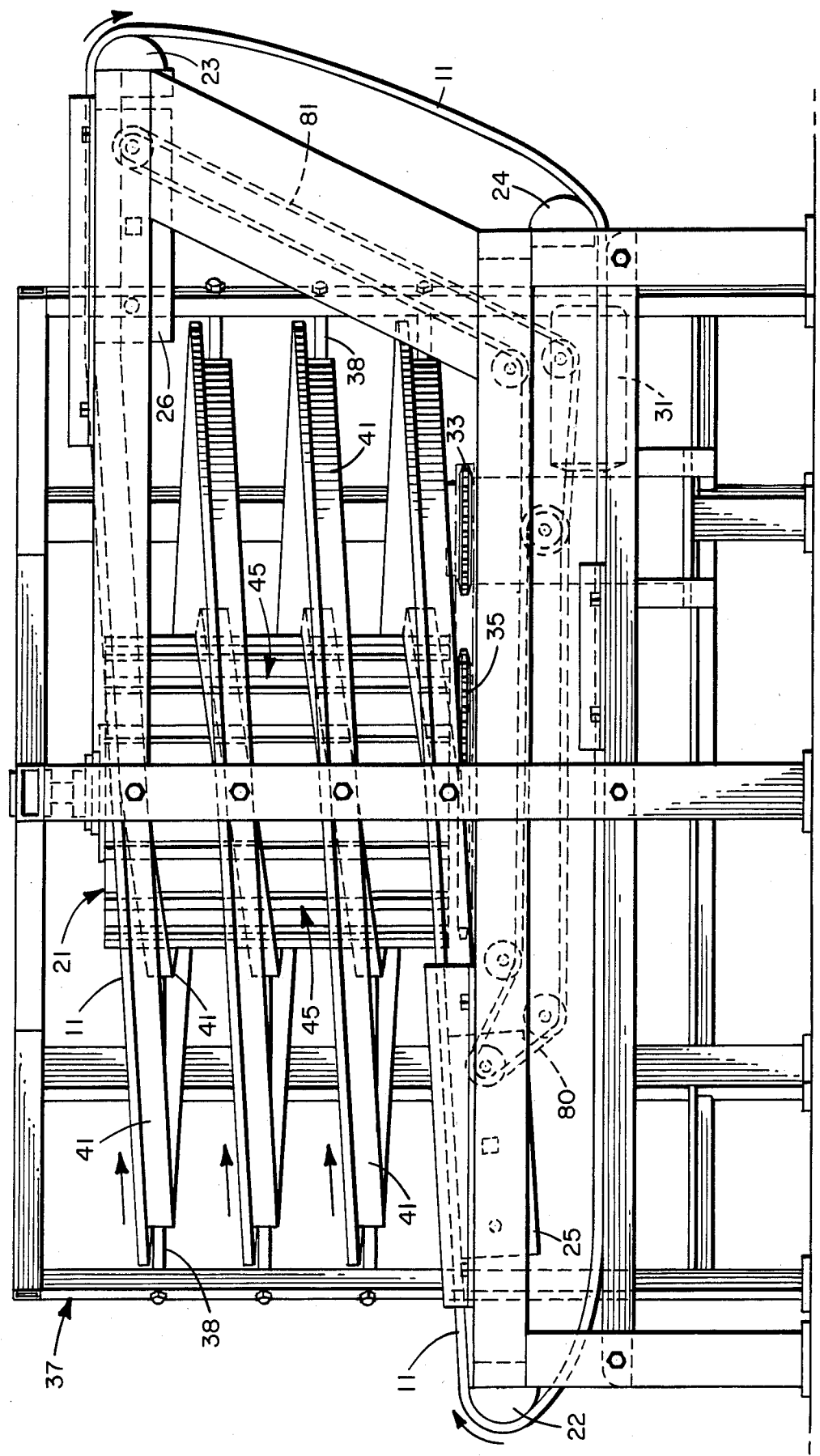
FIG. 1 is a side view of a helical conveyor system according to the present invention, illustrating the primary and secondary drives and the path of the conveyor belt through the system.
Figure 2:
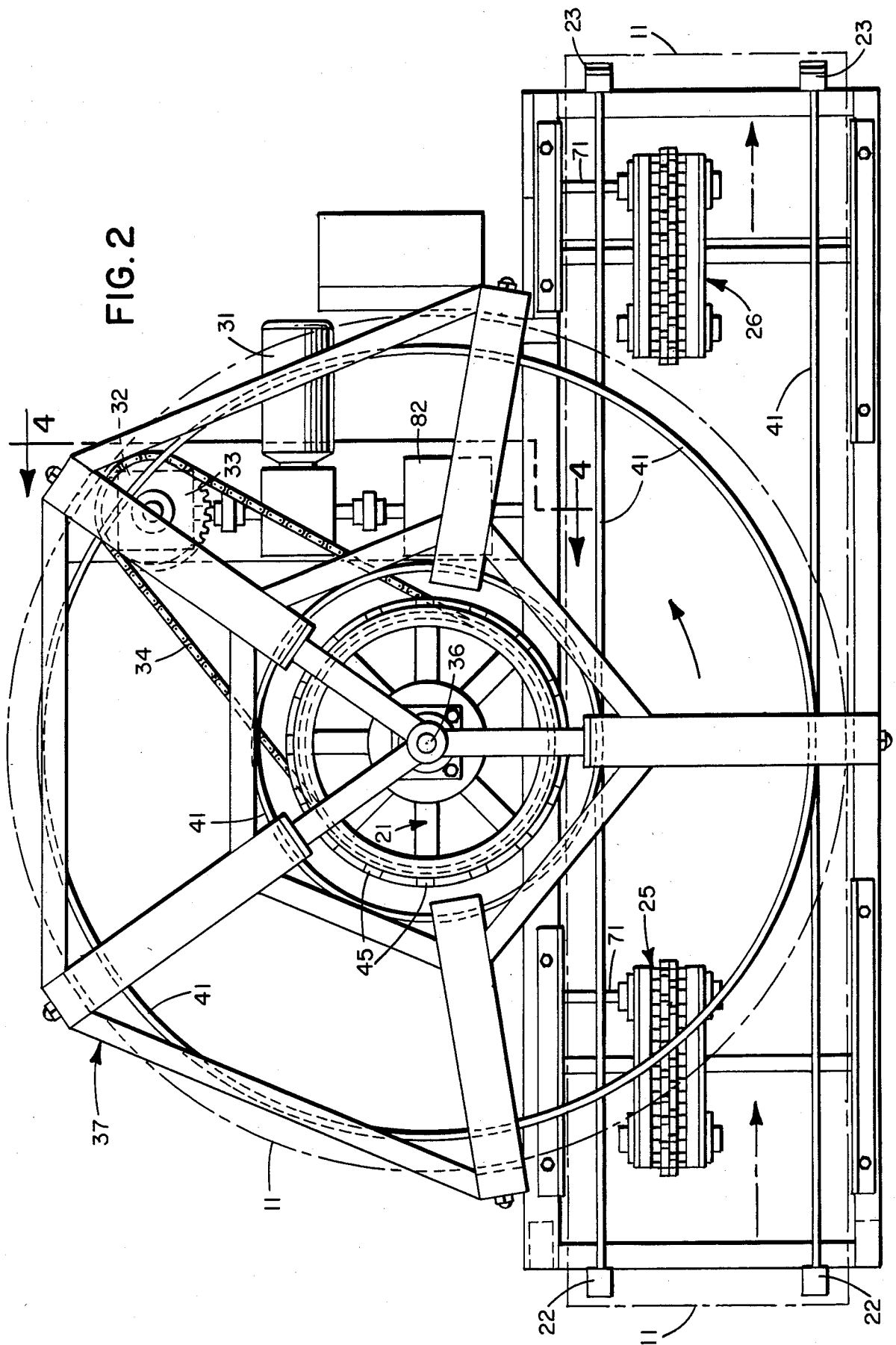
FIG. 2 is a plan view of the conveyor system.
Figure 5:
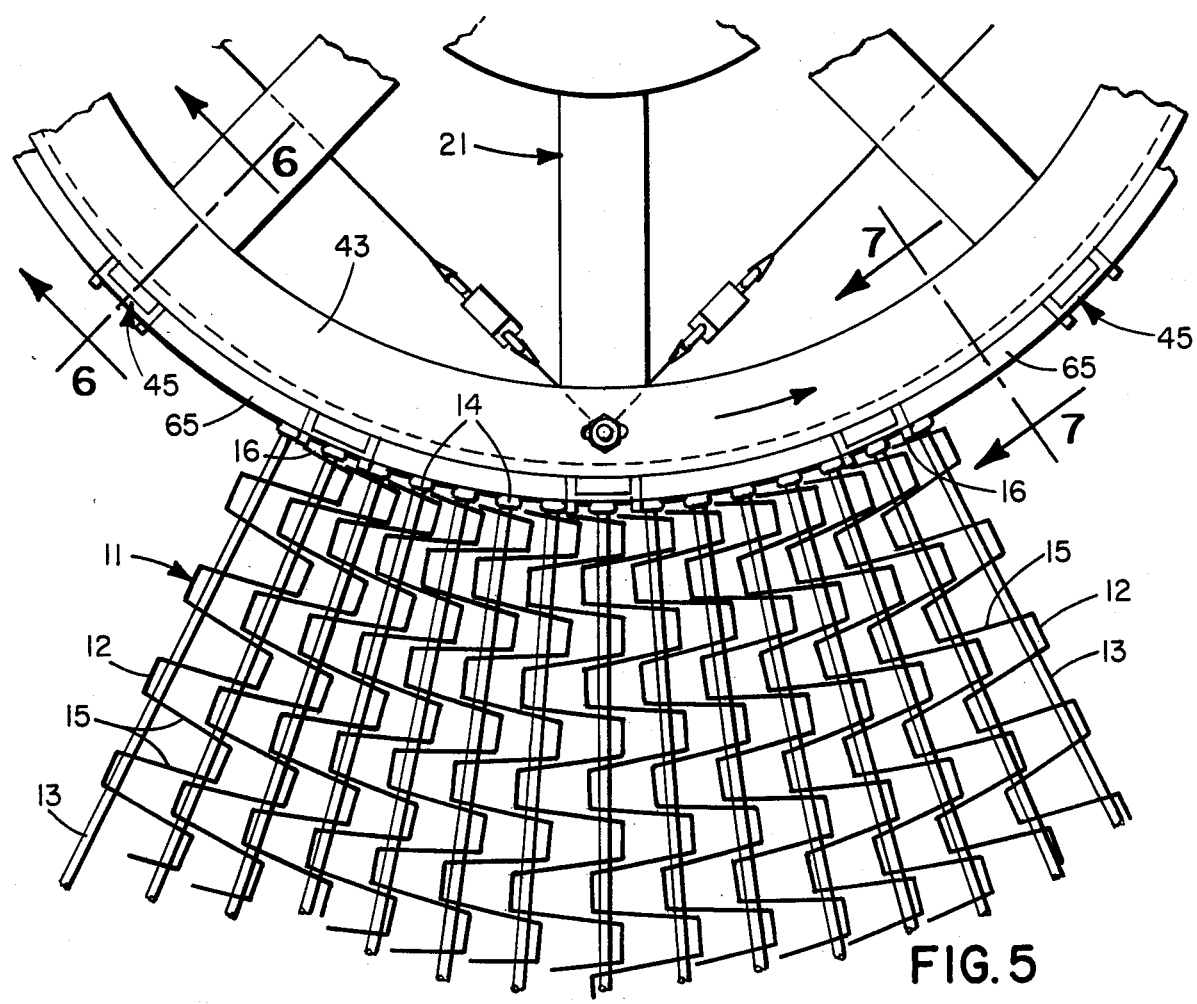
FIG. 5 is a fragmentary plan view of a portion of the conveyor belt being driven in one of the helical loops by the driving cage.

Referring to the drawings in detail, wherein the like numerals indicate like elements, there is depicted in FIGS. 1 and 2, a conveyor system utilizing an endless conveyor belt 11. Belt 11 may be any of several commercially available belts made of metallic or non-metallic links collapsibly connected together to enable the belt to bend in at least one edgewise direction. Thus, the belt may travel in either straight runs or edgewise in lateral curves. Schematically shown in FIG. 5, is one type of belt 11 which may be used. Belt 11 includes a plurality of transversely disposed tractive links 12 of flat metallic wire. The links are connected together by cross-rods 13 which are provided with enlarged heads 14 (FIG. 8) forming protrusions spaced circumferentially along the radially inner edge of the belt, by which protrusions the belt may be driven. The tractive links 12 have longitudinally disposed tractive members 15 which have longitudinal slots (not shown) to receive the cross rods 13. Thus, the links may alternately collapse and expand to permit the belt to bend in an edgewise, lateral direction. The details of construction and operation of the belt 11 are described more fully in Bechtel U.S. Pat. No. 2,872,023. The links 12 preferably vary from those shown in the Bechtel patent by having the outside longitudinal member 16 discontinued between the rods 13 so as to allow a greater collapse of the belt edge and not to interfere with the engagement of the driving members with the rods 14.

Examples of other belts which may be employed are disclosed in Bechtel U.S. Pat. No. 2,872,023, and Roinestad U.S. Pat. Nos. Re. 27,690, 3,225,898 and 4,078,655. The belt may be constructed of metal, plastic or any other suitable material.

Figure 3:
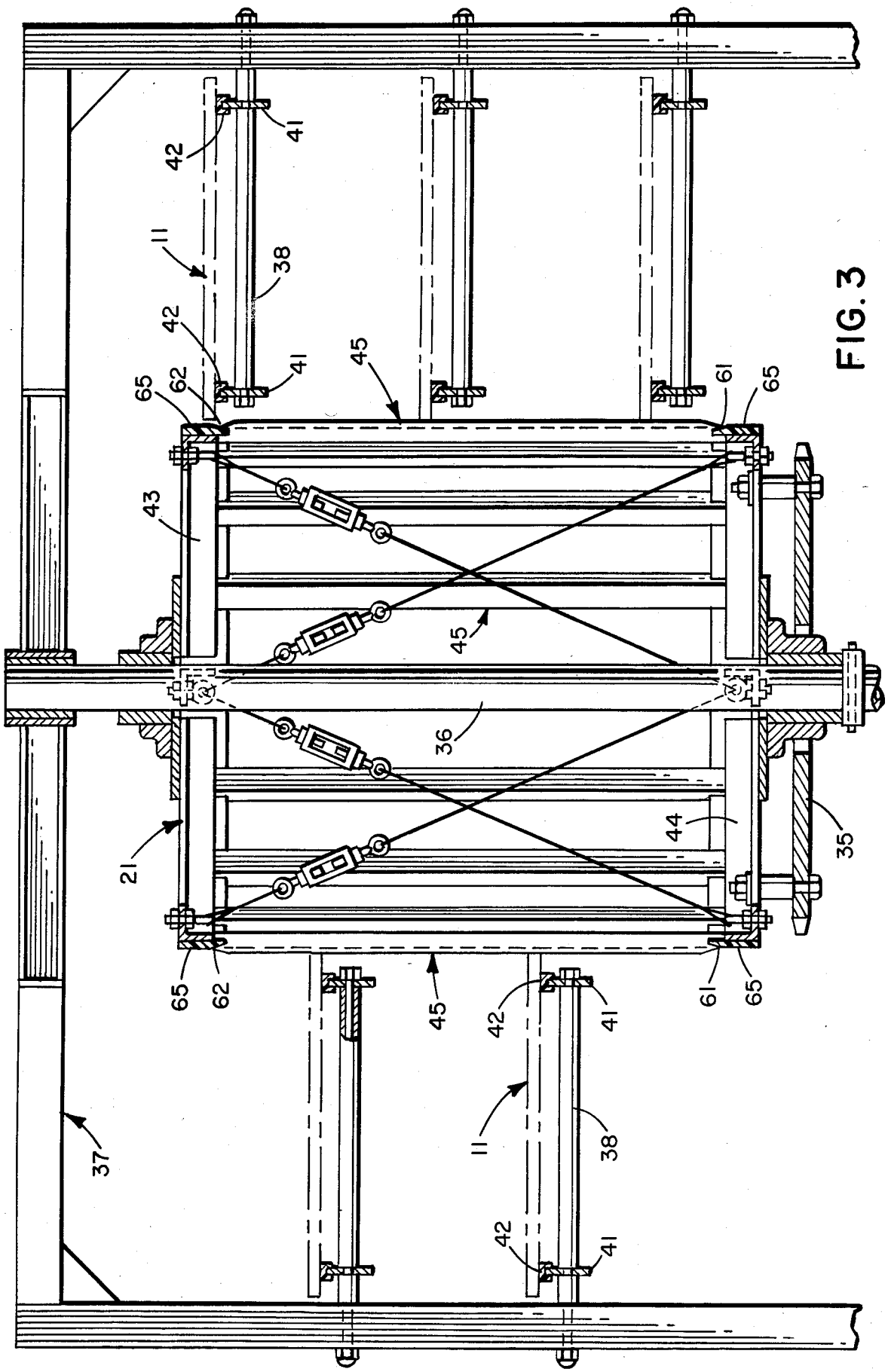
FIG. 3 is a vertical section, illustrating the primary driving cage and the belt supporting structure.

As best shown in FIGS. 1 and 3, the belt 11 travels in an endless path including a helical portion in which the belt is curved laterally edgewise around a driving cage 21 through a plurality of vertically spaced generally horizontal loops. Leading into the cage 21, the belt 11 passes around a pulley 22 along an approach portion leading into the first loop at the bottom end of the helical portion of its path around the cage 21. Leading away from the highest loop at the upper end of the helical path around the cage 21, the belt 11 passes along an exit portion to and around the pulley 23 from which the belt is guided through a return path past pulley 24 and back to pulley 22. As described more fully hereinafter, the belt is positively driven through its endless path by the cage 21 which is the primary drive and by the secondary drives 25 and 26.

The cage 21 is driven by an electric motor 31 through a transmission 32 which includes a spur gear 33, a driving chain 34 and spur gear 35 which is connected to the vertical shaft 36 of the cage 21. The cage 21 is surrounded by a frame 37, in which the shaft 36 is journaled. Also connected to the frame 37 are a series of brackets 38 which support a helical trackway 41 which engages and supports the undersurface of the belt 11 in its helical path around the cage 21. The trackway 41 preferably is provided with a low friction surface element 42. The trackway 41 may be extended as desired to support the belt 11 during any portion of its travel toward and away from the helical loops around the driving cage 21.

The cage 21 is fixed to the shaft 36 and includes top and bottom members 43 and 44 to which are connected a plurality of vertical driving bars 45 which are spaced circumferentially around the cage 21. Driving bars 45 are composed of a rectangular metal member 46 (FIG. 8) with a cap 47 of a wear resistant plastic material. The bars 45 are formed as radially outwardly directed channels having legs 48 and 49 and base 51. The sides of the legs 48 and 49 provide radial driving surfaces 52 facing in one direction and 53 facing in the opposite direction. The base of the channel provides a circumferential bearing surface 54. As described more fully hereinafter, the driving surfaces 53 overlap and abut the enlarged heads 14 of the rods 13 in positive driving engagement. When the direction of belt travel is reversed, the heads 14 are similarly engaged by the surfaces 52. The circumferential bearing surfaces 54 of the bars 45 engage the ends of the rod heads 14 to limit the overlapping of the driving bars and the rod heads 14 to prevent extraneous contact between the bars and the edge of the belt. As the belt 11 passes through the helical loops around the cage 21, the rod heads 14 move vertically up the rods 45 in sliding engagement with the radial driving surfaces 53 and the circumferential bearing surface 54. Excessive overlap between the driving bars 45 and the rod heads 14 would result in extraneous engagement other than that by the surfaces 53 and 54 with the radially inner edge of the belt. Particularly in view of the vertical travel of the edge of the belt along the driving bars 45, such extraneous engagement could result in excessive wear and damage to both the driving bars and the edge of the belt.

Figure 8:
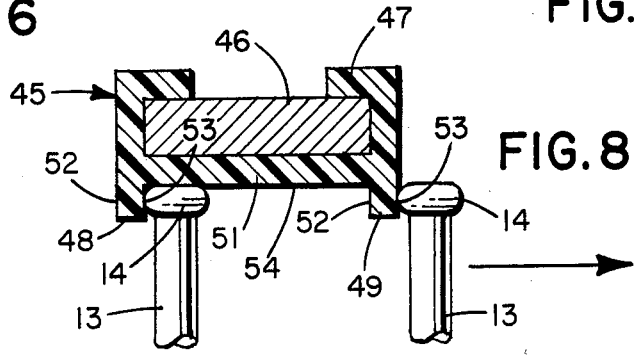
FIG. 8 is a horizontal section taken along the line 8—8 of FIG. 6, illustrating one of the driving bars in driving engagement with the protruding ends of the belt cross-rods.

While the outwardly directed channels are the preferred form for the drive bars 45, other configurations may be employed. For example, rather than the two legs 48 and 49, a T-shaped outer face could be used with a single driving leg positioned in the center of the circumferential surface 54. As shown in FIG. 5, not all of the rods are driven. Further as shown in FIG. 8, not all of the driven rods engage the circumferential surface 54.

Figure 6:
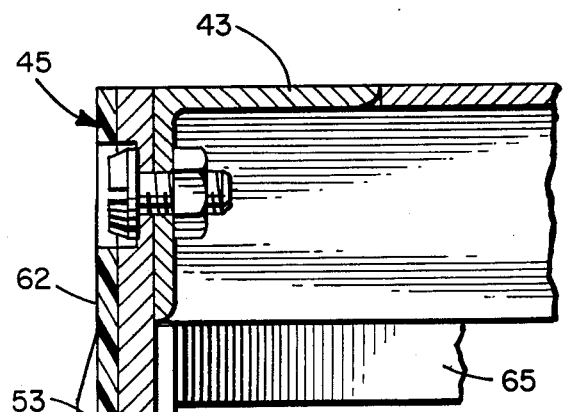
FIG. 6 is a vertical section taken along the line 6—6 of FIG. 5, illustrating the upper portion of one of the driving rods of the cage.

As best seen in FIGS. 3 and 6, the channel legs 48 and 49 of the driving bars 45 are relieved at the lower end 61 and upper end 62 of each of the driving bars 45. These relieved portions permit smooth engagement and disengagement of the rod heads 14 with the channel legs 48 and 49 when the belt enters the lowermost loop of its helical path and exits from the uppermost loop of such path. The relieved section at each end should be sufficiently long so that the heads 14 are engaged by the driving surfaces 53 or 52 only when the belt rests in the first and last loop in the same curvature that characterizes its travel through the remaining loops. In that configuration of the belt, prior to engagement by the driving rods 45, the distance between the rod heads 14 becomes fixed in the same pitch that they will have throughout the remaining loops. As the belt passes from the approach portion leading to the point of tangency with the lowermost loop and the exit portion leading from the point of tangency with the uppermost loop, the pitch of the rod ends 14 is larger than that which occurs in the circular loops of the helical path between such two points of tangency. If the heads 14 were brought into abutting engagement with the driving surfaces 52 or 53 while the rods heads were spaced in the greater pitch of the inlet and outlet portions, the engagement would be rough and disrupt the smooth operation of the belt.

Figure 7:
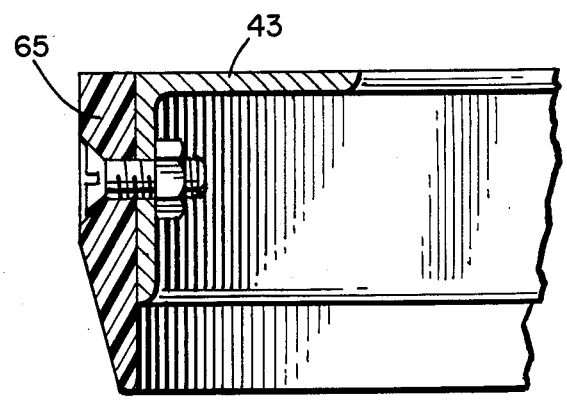
FIG. 7 is a vertical section taken along the line 7—7 of FIG. 5, illustrating the upper periphery of the driving cage.
Figure 11:
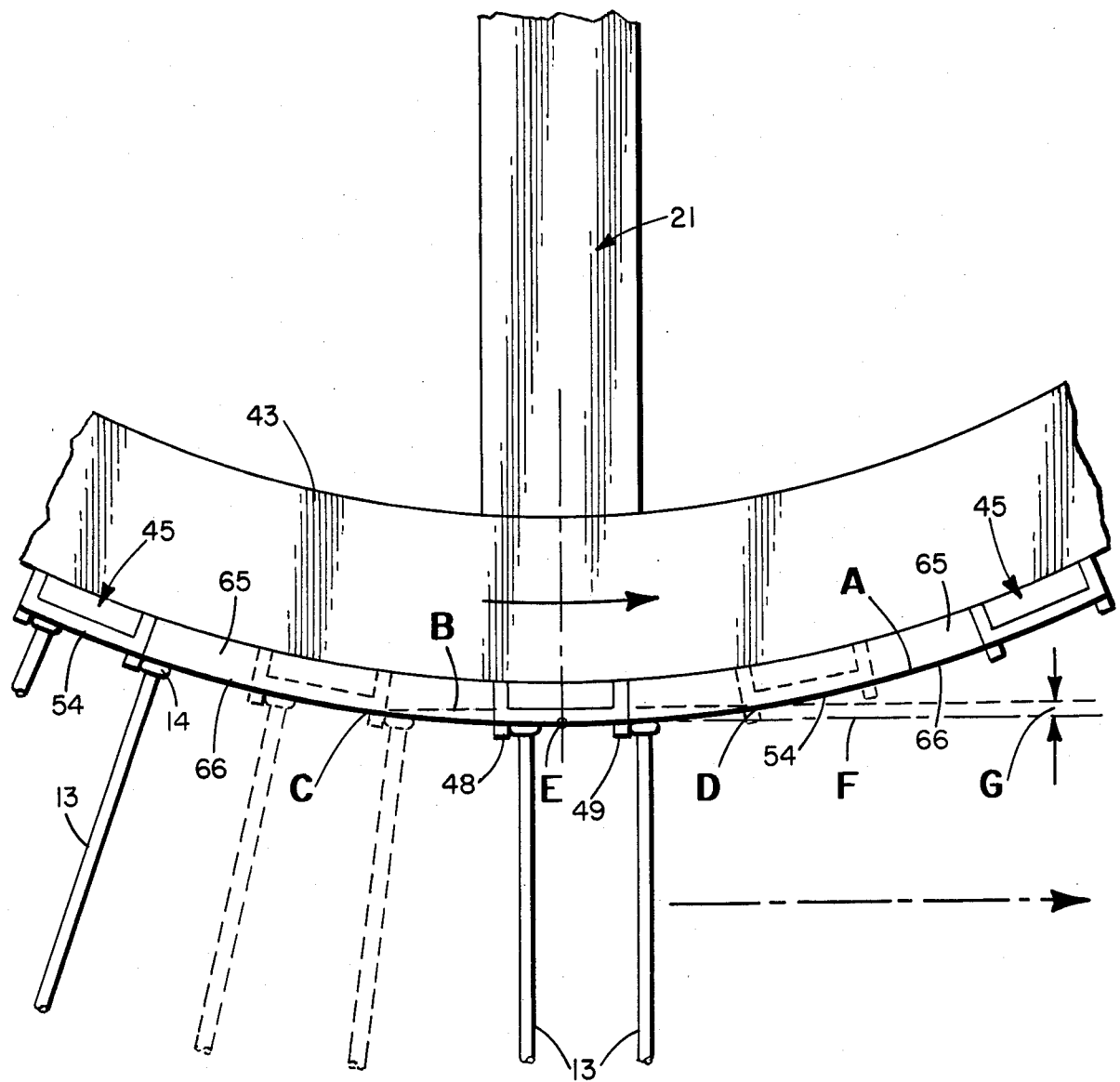
FIG. 11 is a fragmentary plan view of the driving cage illustrating the driving of the belt into the first loop or out of the last loop of the helical portion of its path.

As shown in FIGS. 3, 7 and 11, a segmented sleeve 65 of wear resistant plastic material is mounted around the top end of the cage 21 to fill the spaces between the drive bars 45. An identical segmented sleeve 65 is mounted around the bottom end of the cage 21. Each sleeve 65 has an outwardly facing circumferential bearing surface 66 having the same diameter as the diameter of the circle A (FIG. 11) formed by the circumferential bearing surface 54 of the drive bars 45. The bearing surface 66 completes the circle A defined by bearing surfaces 54 at the ends of the bars 45 where the legs 48 and 49 are relieved. Thus the bearing surface 66 engages the ends of the rod heads 14 in the vicinity of the points of tangency E between the first and last loops and the approach and exit portions of the belts path. Such engagement holds the rod heads in the circle A as they travel to the point of tangency E. If the rods were not so held, they would move radially to the chord B shown in the dotted line between the two driving bars 45 occupying positions C and D equi-distant from the point of tangency E. As each bar 45 moves from point C to tangent point E the bar would push the rod head from the chord B back to the circle A. As the same bar 45 then moves from point E to point D, the rod head would return to the chord B. This back and forth movement of the rod would cause the belt to vibrate laterally over the distance G between the lines B and F resulting in disruption of the articles being conveyed. Such vibration is prevented by the action of the bearing surface 66. At the outlet end of the cage 21, the bearing surface 66 keeps the rod heads 14 on the circle A to the tangent point E from which they pass smoothly along the line F in the exit portion. At the inlet end of the cage 21, the bearing surfaces keep the rod heads on the line F to the tangent point E from which they pass smoothly along the circle A.

As depicted in FIGS. 1 and 2, the supplemental drives 25 and 26 engage the belt near the inlet end and near the outlet end of the helical portion of the belt's travel. It is important that the supplemental drives 25 and 26 drive the belt at the same speed at each of their locations and that these locations be sufficiently near the inlet and outlet ends of the helical portion of the belt's path to maintain substantially fixed the length of belt extending between the inlet end and the outlet end of the helical portion. If the length of the belt in the helical portion should decrease excessively, the tension in the belt would build up rapidly. Such excessive tension could cause the outer edge of the belt to rise up on the trackway, excessive wear of the belt and possible failure either from fatigue stress or a sudden snagging of the belt. If the length of the belt in the helical portion should increase excessively, the belt loops would enlarge to move driven heads 14 of the belt rods away from engagement with the driving surfaces of the bars 45. Thus, the smooth travel of the belt would be seriously disrupted. In such circumstances, the belt might tend to slip rearwardly along the driving bars and pile up in a slack area adjacent to the inlet supplemental drive 25. Accordingly, the belt 11 should be maintained at a fixed length from one end to the other of its helical portion such that the belt rests comfortably in each of the loops under just enough tension to maintain substantially minimal driving pressure between the bars 45 and the rods 13 and substantially minimal tension in the belt. The tension required for normal operation of the conveyor belt in the present system is much less that that required in the prior art helical system disclosed in Roinestad U.S. Pat. No. 3,348,659. Indeed, the present invention results in belt tension on the order of four or five times less than such prior art system. Accordingly, the conveyor system of the present invention can be operated using much greater belt width, loading weight and speed of travel than those of the prior art system of U.S. Pat. No. 3,348,659 without generating excessive tension, rough operation, surging or excessive wear. Surging is mechanically prevented by the positive engagement of the belt with the driving cage and the secondary drives.

Desirably, the supplemental drive 25 is located as close as possible to the beginning of the first loop at the lower end of the helical portion of belt travel and the supplemental drive 26 is located as close as possible to the end of the last loop at the upper end of the helical portion. The first loop begins and the last loop ends at their respective points of tangency with the approach and exits portions of the belt's path. However, the nearness of the supplemental drives to the inlet and outlet ends of the helical portion of belt travel can vary depending upon conditions. It has been found that the supplemental drive at the outlet end can safely be located somewhat further away from the helical path than the supplemental drive at the inlet end. The important factor is that the supplemental drives engage the belts at locations such that they maintain a substantially fixed length of belt extending between the inlet and outlet ends of the helical portion of belt travel so as to enable the belt to be positively driven smoothly through the loops by the cage under substantially minimal tension and substantially minimal driving pressure exerted by the primary drive means.

It has been found that in most installations, the maximum distance between the last driving point of the inlet secondary drive 25 and the point of tangency of the approach portion with the first loop of the helical portion should be not greater than about one half of the diameter of the helical portion of the belt's path. Such diameter is defined as the outside diameter of the circle formed by the outer edge of the belt in its travel in the helical loops about the drive cage 21. Similarly the maximum distance between the the first driving point of the outlet secondary drive 26 and the point of tangency between the last helical loop and the exit path should be not greater than about one diameter of the helical portion of the belts path.

It will be understood that two or more cages 21 can be operated together with the belt travelling helically up one cage and helically down an adjoining cage. Where the two cages are close together, it may be possible to utilize a single supplemental drive between the upper ends of the adjoining cages which serves as the outlet supplemental drive for the first cage and the inlet supplemental drive for the second cage. If the two cages are spaced very far apart, however, it may be preferable to utilize one supplemental outlet drive for the first cage and a separate supplemental inlet drive for the second cage.

Figure 9:
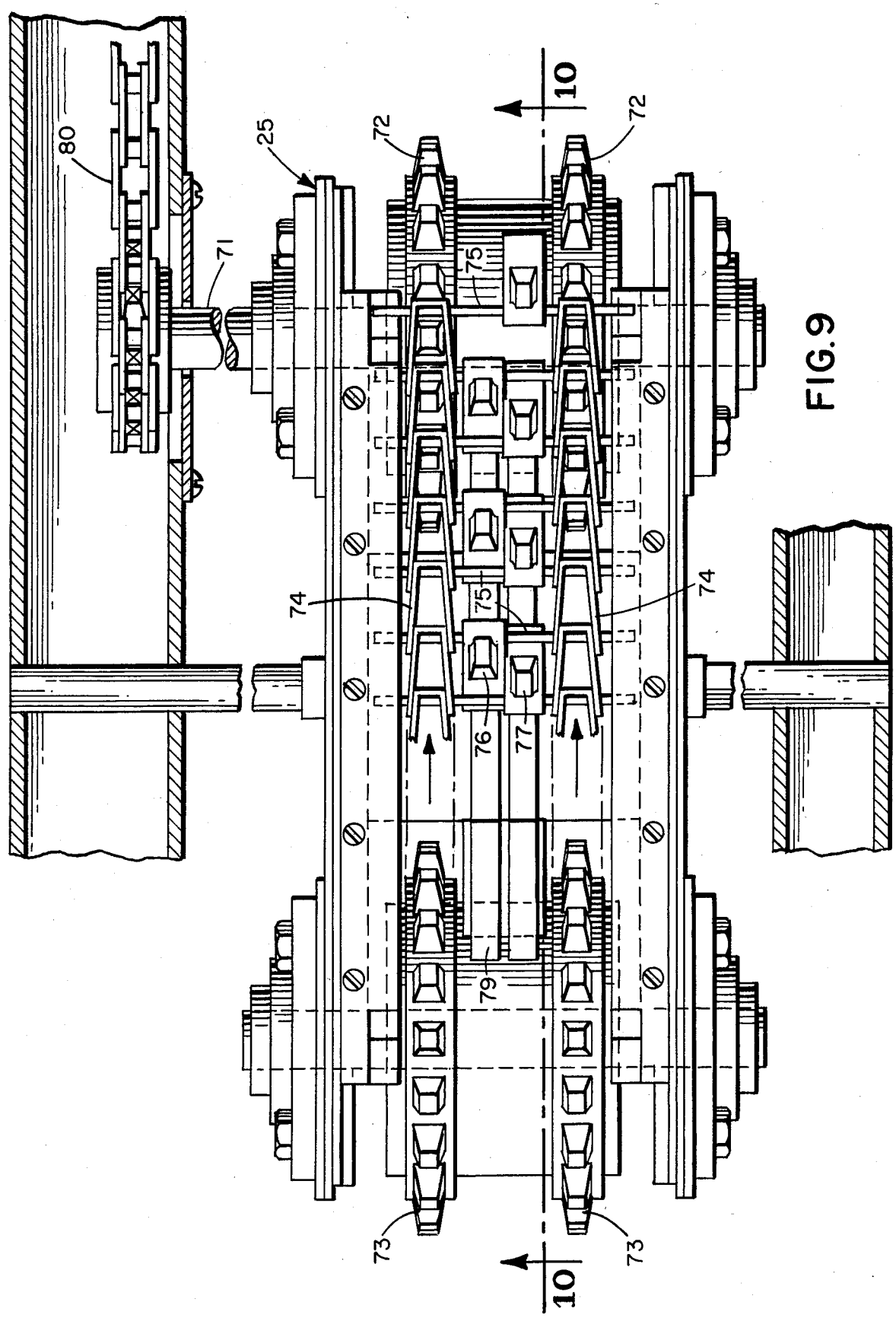
FIG. 9 is a fragmentary plan view partially in section, illustrating one of the secondary drives.
Figure 10:
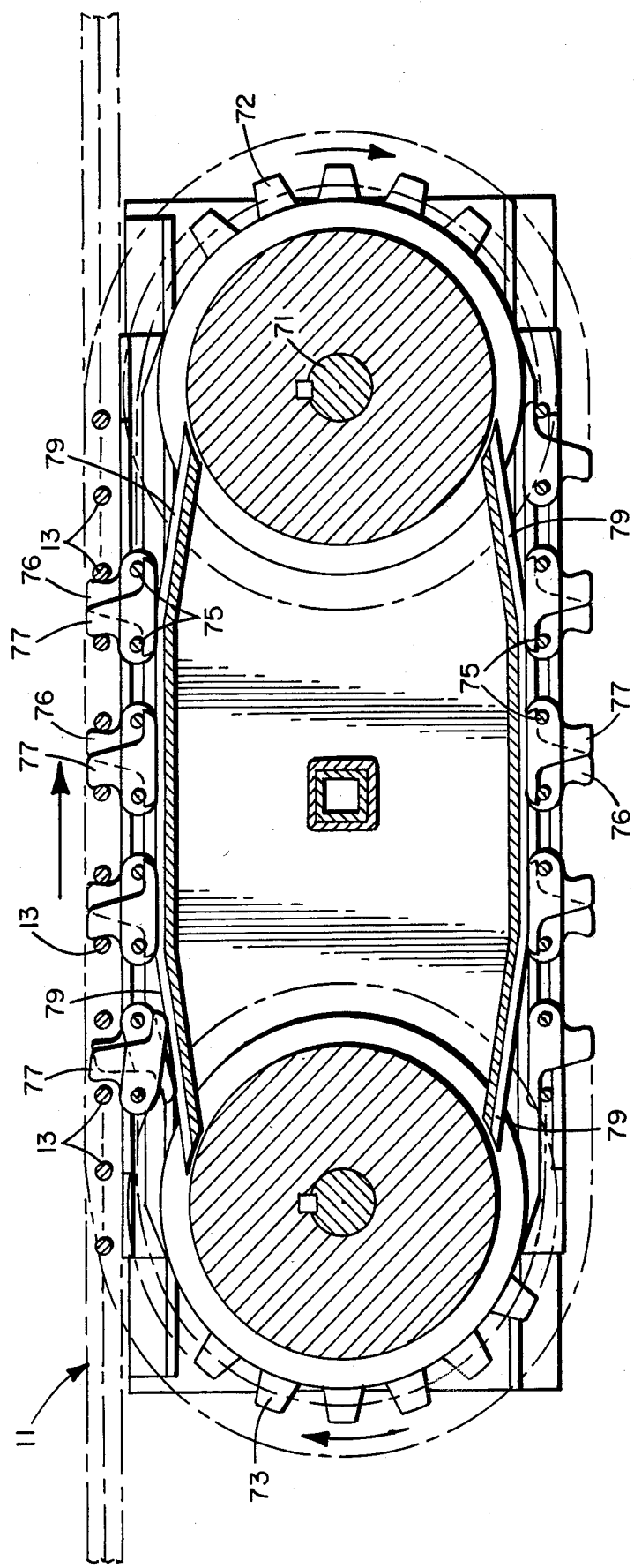
FIG. 10 is a vertical section taken along the line 10—10 of FIG. 9.

A preferred embodiment of the supplemental drive is shown in FIGS. 2, 9 and 10. A somewhat similar type of flat surface traction drive is disclosed in Burnett et al. U.S. Pat. No. 3,033,353. The structure and operation of the two supplemental drives 25 and 26 are identical and they will be described with like reference numerals. Each supplemental drive is connected to a drive shaft 71 which drives a pair of sprockets 72, which in turn, drive a pair of sprockets 73 through drive chains 74. Supported by the drive chains 74 through pins 75 are a plurality of spaced pusher dogs 76 facing in one direction and a plurality of spaced pusher dogs 77 facing in the opposite direction. As shown in FIG. 10, the pusher dogs are moved in an endless path including a straight portion in which the pusher dogs positively engage the belt 11 to move therewith in longitudinal force transmitting relation. The forwardly facing pusher dogs 76 engage the rods 13 along an interior section of the belt 11 in overlapping and abutting, positive driving engagement. Simultaneously, the rearwardly facing pusher dogs 77 engage adjoining portions of the rods 13 in the same manner in longitudinal force transmitting relation in the opposite direction. When the belt is driven in the direction shown in FIG. 10, the pusher dogs 76 drive the belt forward. In order to maintain a fixed length of belt in the helical portion of its travel, it is frequently necessary to retard the belt particularly at the outlet end after it emerges from its helical path. The pusher dogs 77 perform that retarding function. Thus, the supplemental drives selectively apply forward driving forces and backward retarding forces to the belt to maintain the desired fixed length in the helical portion. If desired, the direction of travel of the belt can be reversed so that it enters the upper end of the cage and exits from the lower end of the cage. In that event, the direction of the primary and supplemental drives are reversed wherein the pusher dogs 77 perform the driving function and the pusher dog 76 perform the retarding function as required. Further as shown in FIG. 10, the pusher dogs 76 have a forward face which is inclined forwardly and the pusher dogs 77 moves the pusher dogs which is inclined rearwardly. As the chain 74 moves the pusher dogs through their endless path, they are moved upwardly into engagement with the belt. As they approach the belt, the upper ends of the pusher dogs 76 and 77 are tilted forwardly and backwardly, respectively by the cam surface 79. As the pusher dogs are brought into their normal driving position, the inclined faces of the pusher dogs are brought into engagement with the rods 13 and function to hold the rods down thereby deterring or preventing accidental disengagement of the belt from such drives.

Figure 4:
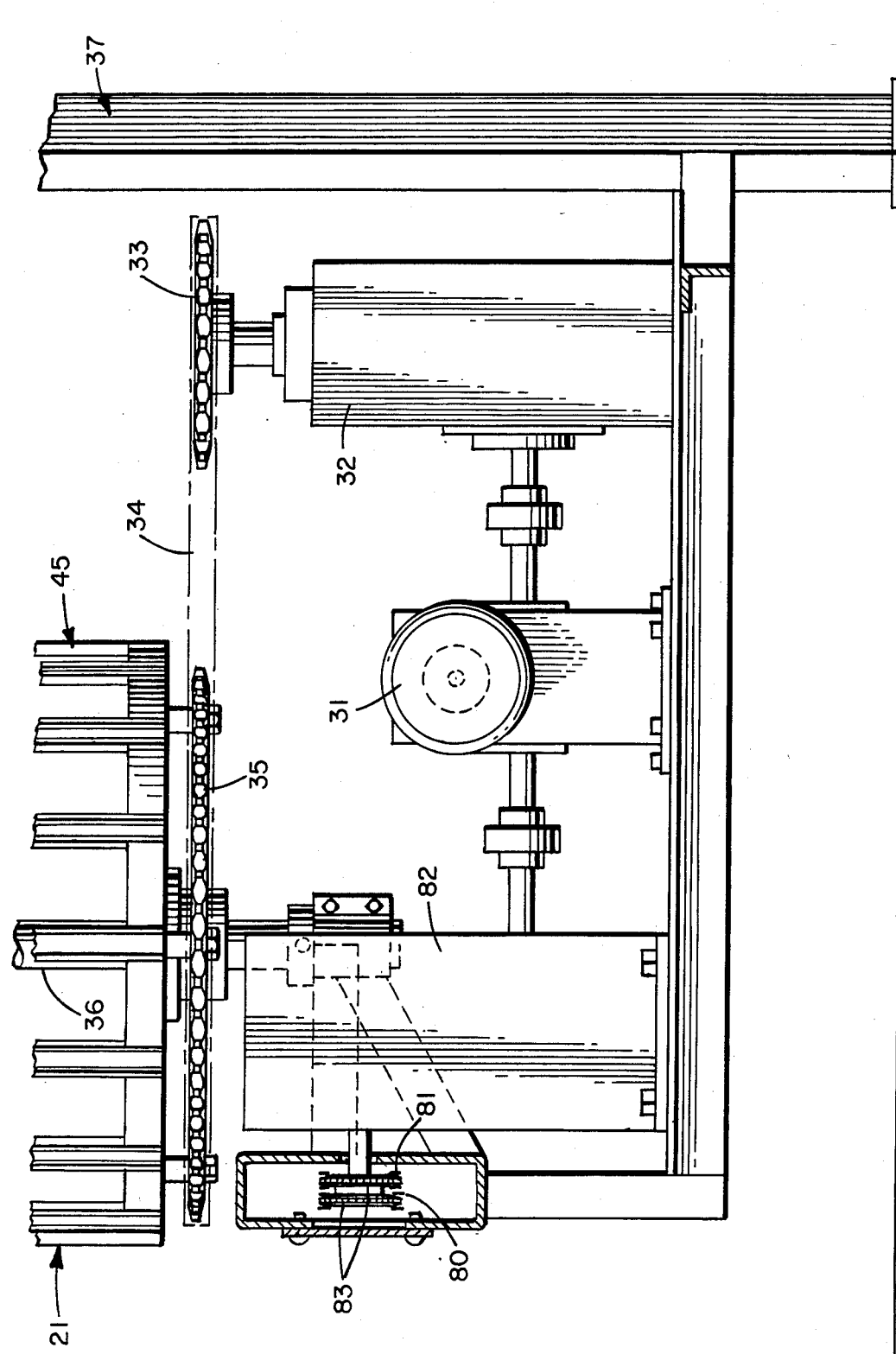
FIG. 4 is a fragmentary elevational view partially in section taken along the line 4—4 of FIG. 2, illustrating a portion of the power train for the primary and secondary drives.

As illustrated in FIGS. 1, 2 and 4, the same electric motor 31 drives both the primary driving cage 21 and the supplemental drives 25 and 26. The supplemental drives 25 and 26 are driven by an endless chains 80 and 81 through the transmission 82 and spur gear 83. Desirably, the drives 25 and 26 are driven by a common positive mechanical connection to the driving motor 31 which necessarily drives the pusher dogs of both of the supplemental drives 25 and 26 through their endless paths at identical speed in terms of pitches per minute. Accordingly, the supplemental drives 25 and 26 drive the belt 11 at identical speeds at their respective locations to fix the length of belt between the two drives. Thus, the supplemental drives 25 and 26 have their speeds synchronized precisely. The primary drive provided by the rotatable cage 21 is also synchronized with the supplemental drives 25 and 26 but the speed of the rotation of the cage 21 relative to the supplemental drives can be adjusted as necessary. Any suitable mechanism for speed adjustment can be provided. At start-up of the conveyer system, the speed of the cage relative to the supplemental drives is adjusted so that the drive rods 45 move the belt 11 at a speed as closely synchronized as possible with the speed of movement of the belt past the supplemental drives 25 and 26. Miniscule variances in the speed of the cage 21 relative to the supplemental drives can be tolerated by occasional slippage of individual rod ends 14 from engagement with one of the channel legs 48 or 49. Said occasional slippage does not interfere with the positive character of the drive. When slippage at one of the driving bars occurs, the positive driving engagement of all or most of the remaining driving bars is maintained.

Numerous characteristics and advantages of the invention have been set forth in the foregoing description, together with details of the structure and function of the invention. The novel features thereof are pointed out in the appended claims. The disclosure, however, is illustrative only, and changes may be made in detail, especially in the manner of shape, size and arrangement of parts, within the principle of the invention, to the full extent indicated by the broad general meaning of the terms in which the appended claims are expressed.

I claim:

1. A conveyor system comprising
    an endless flat belt having a plurality of links connected together and adapted for alternate collapse and expansion along at least one edge of said belt to permit passage of the belt around lateral curves,
    means to support said belt for passage through an endless path including a helical portion extending through a plurality of vertically spaced loops with the belt curved laterally in each of said loops, a planar approach portion leading into the first loop at one end of said helical portion and a planar exit portion leading away from the last loop at the other end of said helical portion, guide means directing said belt into said planar approach portion, primary drive means having drive surfaces engaging said belt in positive driving relationship at a plurality of places closely spaced circumferentially along a radially inner edge of said belt in each of said loops to positively drive said radially inner edge at the same speed as said driving surfaces, secondary drive means synchronized with said primary drive means and positively engaging said belt at a first location along said planar approach portion closely adjacent said one end of said helical portion and at a second location along said planar exit portion closely adjacent said other end of said helical portion to cause the belt to travel at the same speed at said first and second locations, said secondary drive means having forwardly facing drive surfaces engaging said belt in forward driving relation and rearwardly facing retarding surfaces engaging said belt in rearward retarding relation while said belt moves in a planar path along said approach and exit portions, said first and second locations being positioned to maintain a substantially fixed length of belt extending between said one end and said other end of said helical portion to enable said belt to be positively driven smoothly through said loops by said primary drive means under substantially minimal tension and substantially minimal driving pressure exerted by said primary drive means.

2. A conveyor system according to claim 1 wherein said secondary drive means includes hold down means to prevent accidental disengagement of the belt from said secondary drive means.

3. A conveyor system according to claim 1 wherein said secondary drive means comprises a pair of drive components at said first and second locations, each of said drive components comprising a plurality of spaced pusher dogs movable in an endless path including a straight portion in which said pusher dogs positively engage said belt to move therewith in longitudinal force transmitting relation, and power means to operate said drive components at the same speed, said pusher dogs being positioned relative to said belt to selectively apply said forward driving and backward retarding forces to said belt to maintain said fixed length of belt.

4. A conveyor system according to any of claims 1 through 3 wherein said belt has a plurality of protrusions spaced along said radially inner edge, said primary drive means has radial driving surfaces overlapping and abutting at least some of said protrusions in positive driving relationship.

5. A conveyor system according to claim 4 wherein said primary drive means includes means engaging said protrusions to limit said overlapping to prevent substantial extraneous contact between said primary drive means and said belt.

6. A conveyor system according to claim 5 wherein said radial driving surfaces are relieved adjacent the ends of said helical portion so that said radial driving surfaces do not engage said protrusions over an entry section of the first loop at said one end and over an exit section of the last loop at said other end of said helical portion, said engagement of said driving surfaces and protrusions occurring in said first and last loops only when the curvature of the radially inner belt edge is the same as in the remaining loops.

7. A conveyor system according to claim 4 wherein said radial driving surfaces are relieved adjacent the ends of said helical portion so that said radial driving surfaces do not engage said protrusions over an entry section of the first loop at said one end and over an exit section of the last loop at said other end of said helical portion, said engagement of said driving surfaces and protrusions occurring in said first and last loops only when the curvature of the radially inner belt edge is the same as in the remaining loops.

8. A conveyor system comprising
an endless flat belt having a plurality of links connected together and adapted for alternate collapse and expansion along at least one edge of said belt to permit passage of the belt around lateral curves, said belt having protrusions spaced along at least one edge thereof, each of said protrusions having a side surface and an end surface, means to support said belt for passage through an endless path including a helical portion extending through a plurality of vertically spaced circular loops with the belt curved laterally in each of said loops, with said protrusions on the radially inner edge thereof, a planar approach portion leading tangentially into the first loop at one end of said helical portion and a planar exit portion leading tangentially away from the last loop at the other end of said helical portion, guide means directing said belt into said planar approach portion, primary drive means comprising a cylindrical cage rotatable about a vertical axis and having a plurality of vertical driving bars spaced circumferentially around the cage, said bars having radial driving surfaces overlapping and abutting the side surfaces of at least some of said protrusions in positive driving relationship to positively drive said protrusions at the same speed as said driving surfaces and circumferential surfaces engaging the end surfaces of at least some of said protrusions to limit the overlapping of said bars and said protrusions to prevent substantial extraneous contact between said cage and said belt, said protrusions being slidable vertically along said bars while said cage rotates to positively drive said belt, and secondary drive means synchronized with said primary drive means and positively engaging said belt at a first location along said planar approach portion closely adjacent said one end of said helical portion and at a second location along said planar exit portion closely adjacent said other end of said helical portion to cause the belt to travel at the same speed at said first and second locations, said secondary drive means having forwardly facing drive surfaces engaging said belt in forward driving relation and rearwardly facing retarding surfaces engaging said belt in rearward retarding relation while said belt moves in a planar path along said approach and exit portions, said first and second locations being positioned to maintain a substantially fixed length of belt extending between said one end and said other end of said helical portion to enable said belt to be positively driven smoothly through said loops by said cage under substantially minimal tension and substantially minimal driving pressure exerted by said cage.

9. A conveyor system according to claim 8 wherein said bars are relieved adjacent the ends of said helical portion so that said radial driving surfaces do not engage said protrusions over an entry section of the first loop at said one end and over an exit section of the last loop at said other end of said helical portion, said engagement of said driving surfaces and protrusions occurring in said first and last loops only when the curvature of the radially inner belt edge is the same as in the remaining loops.

10. A conveyor system according to claim 9 wherein said cage has circumferential bearing surfaces positioned between said bars adjacent both ends of said helical portion where said bars are relieved and completing the circle defined by the circumferential bearing surfaces of said bars so that said circumferential cage surfaces retain said protrusions in said circle interiorly adjacent the tangent points between said first and last loops and said approach and exit portions.

11. A conveyor system according to any of claims 1 through 3, or 8 wherein said secondary drive means are located at a distance from points of tangency of said helical portion with said approach and exit portions equal to not more than one-half of the diameter of said helical portion on the approach side thereof and not more than one diameter of said helical portion on the exit side thereof.

12. A conveyor system according to claim 11 wherein at least a portion of said secondary drive means engages said belt on said approach side within the outer circumference of said helical portion.

13. A conveyor system according to either of claims 1 or 8 further comprising means to adjust the relative speed of said primary and secondary drives.

14. A conveyor system according to claim 13 wherein said secondary drive means includes hold down means to prevent accidental disengagement of the belt from said secondary drive means.

15. A conveyor system according to any of claims 1 through 3, or 8 wherein at least a portion of said secondary drive means engages said belt on said approach side within the outer circumference of said helical portion.

16. A conveyor system according to either of claims 3 or 8 wherein said secondary drive means includes hold down means to prevent accidental disengagement of the belt from said secondary drive means.

17. A method of driving an endless flat belt along a path having a helical portion, a planar entrance portion and a planar exit portion which comprises
supporting said belt in a laterally curving orientation to form a plurality of vertically spaced generally horizontal loops in said helical portion with the radially inner edges of said belt in said loops defining substantially a cylinder,
applying a positive primary driving force circumferentially of said cylinder to the radially inner edge of said belt at closely spaced places along said loops,
selectively applying positive secondary driving and positive retarding forces substantially simultaneously to said belt at a first location along said planar portion closely adjacent the entrance end of said helical portion and at a second location along said planar exit portion closely adjacent the exit end of said helical portion to maintain a substantially constant length of the belt throughout said helical portion under substantially minimal longitudinal tension.

* * * * *